United States Patent [19]

Goldstein et al.

[11] 4,341,117

[45] Jul. 27, 1982

[54] ELECTRONIC THERMOMETER

[75] Inventors: Harold Goldstein, Westbury; William Montren, Bay Shore, both of N.Y.

[73] Assignee: Patient Technology, Inc., Hauppauge, N.Y.

[21] Appl. No.: 695,688

[22] Filed: Jun. 11, 1976

Related U.S. Application Data

[62] Division of Ser. No. 392,961, Sep. 5, 1973, Pat. No. 3,978,325.

[51] Int. Cl.³ .............................................. G01K 7/24
[52] U.S. Cl. ................................................... 374/170
[58] Field of Search .................. 73/362 AR, 343, 344, 73/359 R, 360, 341, 342

[56] References Cited

U.S. PATENT DOCUMENTS

| | | | |
|---|---|---|---|
| 3,906,797 | 9/1975 | Turner | 73/362 AR |
| 3,972,237 | 8/1976 | Turner | 73/362 AR |
| 3,978,325 | 8/1976 | Goldstein et al. | 73/362 AR |

*Primary Examiner*—Willis Little
*Attorney, Agent, or Firm*—Bauer & Amer

[57] ABSTRACT

An electronic computer which provides an accurate final temperature reading prior to the actual stabilization of the temperature sensor. An algorithm is provided which allows making only two temperature measurements at preselected times yet accurately predicts the end stabilization temperature. A temperature resistance varying is converted to a temperature-frequency varying signal, clocked into an up/down counter, then displayed digitally. A thirty second timing sequence is also digitally displayed for use when the invention is utilized for medical applications.

5 Claims, 3 Drawing Figures

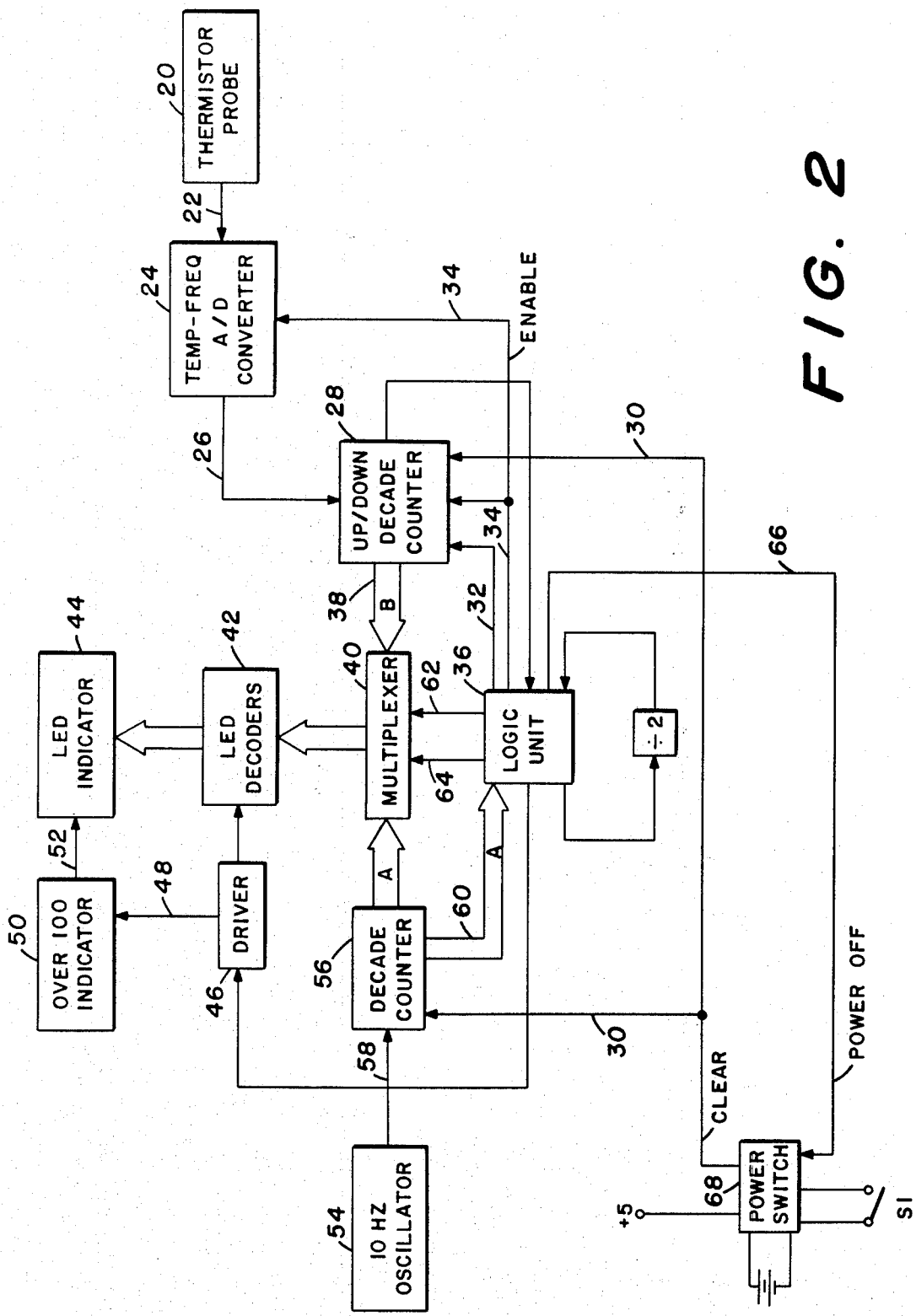

ELECTRONIC THERMOMETER

This is a division of application Ser. No. 392,961, filed Sept. 5, 1973, now U.S. Pat. No. 3,978,325.

BACKGROUND OF THE INVENTION

This invention relates generally to improvements in electronic thermometer devices, and more particularly to electronic thermometers which will provide accurate and reliable temperature measurements may be obtained without waiting for the temperature sensing unit to reach its stabilization point.

One of the primary measurements made in medicine is the measurement of the body's temperature. This measurement was historically made using a glass bulb mercury thermometer which is still used extensively despite obvious drawbacks. More recently, however, with the advent of sophisticated electronics, electronic thermometers have been developed. These instruments use thermocouples or thermistors as the temperature sensing device and then amplify and otherwise process the signal to provide an analog or digital readout. These devices have generally been rather bulky and cumbersome. Furthermore, they have been rather slow. This is due to the fact that temperature sensing units require a rather long time to stabilize at the final temperature. Attempts have been made to alleviate this problem by using various schemes involving the anticipation of the final stabilized temperature.

It is therefore an object of the present invention to provide an electronic temperature measuring device which will accurately predict a stabilized temperature in a relatively short period of time.

It is a further object of the invention to provide a rapid output electronic temperature sensing instrument for use in the medical arts.

It is still a further object of the invention to provide a digital temperature display at a time prior to the temperature sensing instrument stabilization time.

It is another object of the present invention to provide apparatus producing a digital time display followed by a digital temperature display which is in anticipation of the final stabilized temperature.

SUMMARY OF THE INVENTION

The present invention provides apparatus to rapidly and accurately measure temperature without the necessity of waiting for a sensing instrument to reach a stabilized state. In order to accomplish such rapid temperature measurements, it is desirable to make the fewest possible actual temperature measurements. Obviously, one measurement will not be sufficient to predict a final stabilized temperature. The present invention provides an algorithm and attendant computing apparatus, sufficient to allow only two temperature measurements to be made. The algorithm of the invention recognizes that the response curve of a temperature sensing unit such as a thermistor may be expressed as an exponential function in terms of the rest and final temperature values. This algorithm is useful generally because manufacturers of thermistors try very hard to obtain the exact response curve for all devices of the same type. Upon solution of the algorithm of the present invention it is found that only two temperature measurements are required. These two measurements, however, must be made precisely at specified times, these times are determined by the thermal time constant of the particular type of thermistor in use. Once it is recognized that only two temperature measurements need be made, and the exact timing of these measurements is known then this information may be fed to a special purpose computer. Such computer, provided by the invention, then processes the measurement signals and produces a digital readout of the exact temperature at a time well before the thermistor has actually stabilized.

As is well known, a thermistor presents a varying resistance when confronted with a varying temperature. A varying resistance, however, is not the most convenient signal with which to work. Therefore, the invention provides an analog to digital converter which receives the varying resistance signal from a thermistor or the like and converts it to a frequency varying signal as required by the algorithm. This is accomplished by utilizing the resistance of the sensing instrument as a component of a resistor capacitor controlled oscillator. In this way, as the resistance varies so will the frequency of oscillation of the oscillator. Furthermore, by choosing the frequency of oscillation such that it will be a multiple of the actual temperature under measurement then the predicted temperature may be more easily obtained. This frequency-varying temperature-dependent signal is then processed according to the mathematical equation, which was devised by the algorithm as previously discussed. Upon solution of this equation the actual temperature measurement may be easily displayed digitally by use of light emitting diodes or the like. In accomplishing this signal processing and timing operation a second oscillator is required; this oscillator may then be used with the display devices already incorporated to display a timing signal which could be used for obtaining a patients pulse. Thus the patients pulse rate may be determined simultaneously with the same patients temperature.

BRIEF DESCRIPTION OF THE DRAWINGS

FIG. 2 is a block diagram of a preferred embodiment of electronic temperature measurement apparatus according to the present invention.

DESCRIPTION OF THE PREFERRED EMBODIMENT

Figure 1:
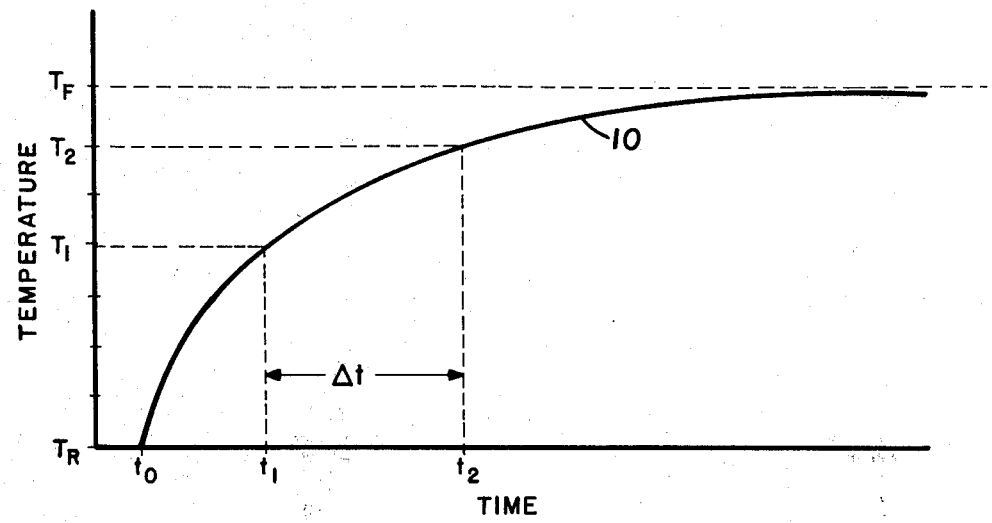
FIG. 1 is a characteristic curve of the temperature response of a typical thermistor temperature sensing unit.

Referring now to FIG. 1, a typical response curve of a temperature measuring instrument which utilizes a thermistor type sensing unit is shown. The abscissa axis T represents temperature. This response curve 10 is well known and is generally described as an exponential curve. A temperature at which the thermistor will be at rest is denoted as $T_R$, a first measured temperature is $T_1$, a second measured temperature $T_2$ and a final temperature $T_F$. The response curve will theoretically approach this $T_F$ value asymptotically and hence the time that this temperature $(T_F)$ will be reached will be infinity. The time of the at rest temperature $T_R$ is denoted as $t_o$, while $t_1$ corresponds to the occurrence of the first temperature measurement $T_1$ and $t_2$ corresponds to the occurrence of the second temperature measurement $T_2$.

Any temperature T along the response curve 10, at some time t, will be given by the equation:

$$T = T_R + (T_F - T_R)(1 - e^{-t/\tau}) \tag{1}$$

where T represents the thermal response of the particular thermistor under consideration. If we write this equation (1) for the two temperature measurements $T_1$, and $T_2$, then solve for the final temperature $T_F$, we have:

$$T_F = \frac{T_2 - (T_1)e^{-\frac{(t_2-t_1)}{\tau}}}{1 - e^{-\frac{(t_2-t_1)}{\tau}}} \tag{2}$$

by allowing $(t_2-t_1)$ to be represented by $\Delta t$, as shown in FIG. 1, equation (2) becomes:

$$T_F = \frac{T_2 - T_1 e^{\frac{-\Delta t}{\tau}}}{1 - e^{\frac{-\Delta t}{\tau}}} \tag{3}$$

Since it is an objective of the invention to obtain a final temperature, without waiting for the sensing unit to stabilize, in the simplest manner possible, equation (3) should be solvable in the simplest manner also.

If we arbitrarily choose a value of $e^{t/\tau}$ in order to allow equation (3) to be in its simplest form, we might choose 0.5, then:

$$e^{\frac{-\Delta t}{\tau}} = 0.5 \tag{4}$$

Having thus chosen the value in equation (4) we can then rewrite equation (3) as:

$$T_F = 2T_2 - T_1 \tag{5}$$

Rewriting equation (4) in different form yields $$e^{\frac{\Delta t}{\tau}} = 2 \tag{6}$$

and solving for t, $$\Delta t = t_2 - t_1 = \tau \ln 2 \tag{7}$$

A typical value for $\tau$ is a conventional thermistor might be 19 seconds. It is a simple matter to obtain the natural logarithm of 2 using tables, and then solving equation (7) for $\Delta t$ we have:

$$\Delta t = 0.693(19 \text{ sec.}) \approx 13 \text{ sec.} \tag{8}$$

This means that the invention only requires a delay of 13 seconds between the first temperature measurement $T_1$, and the second temperature measurement $T_2$. Since the invention is intended for practical use, it has been found that upon the invention of the thermistor probe into the patients body, the tissue surrounding the probe may be lowered in temperature momentarily by the lower temperature of the probe. Because of this it is advantageous to delay taking the first temperature measurement $T_1$. For the case just discussed where $\Delta t$ equals 13 seconds, a convenient delay time would be 17 seconds, thereby allowing the operational cycle to be 30 seconds, an ideal time in which to measure the patients pulse as discussed earlier.

Referring now to FIG. 2, a preferred embodiment of the invention is shown in block diagram form. The thermistor probe 20 is inserted into the patients body orally or rectally or otherwise, and produces a signal on line 22 which is fed to an analog to digital converter 24. This analog to digital converter 24, converts the signal to a frequency varying signal. This converter 24 will be shown in more detail hereinafter. This signal of varying frequency is fed on line 26 to an up/down decade converter 28. This up/down decade counter 28 is of the conventional type and will be used to perform the operation required by equation (5). The signal on line 26 from the converter 24 has a frequency which is equal to ten times the temperature as measured by the probe 20. Because of this the up/down decade counter 28 can be used to solve equation (5). If the counter 28 is cleared by a signal on line 30, to either all zeroes or all ones, then the counter is selected to be a down counter by a signal on line 32, when the first temperature measurement is clocked into to counter 28 and, the counter will count down the exact number of pulse which appear on line 26. The counter 28 and the analog to digital converter 24 are enabled for a preselected period of time, I see, by an enable signal appearing on line 34. The enable signal is produced by a logic unit 36 which will be explained in further detail later. In order to solve equation (5) the first measurement $T_1$ must be subtracted from twice the value of $T_2$, and upon this first use of the down counter the required subtraction has already been performed. A count-up signal now appears on line 32 from the logic unit 36, and a second temperature measurement $T_2$ on line 26 is counted up into counter 28. In order to accomplish the doubling of this measurement the signal on line 26 is allowed to enter the up-counter for a time, 2 sec, which is exactly two times the previously mentioned preselected time allowed for the down-counting function of the counter 28. In this way equation (5) is solved and the desired $T_F$ information is contained in the counter 28. This information is then fed by multi-channel lines 38 to a multiplexer 40, which in a simple embodiment may comprise merely digital switches. The information is fed through the multiplexer 40 to a conventional decoder 42 which is used to decode the signal for display by well known light emitting diodes digital display 44. The light emitting diode decoder 42 is driven by a conventional driver unit 46, which also produces a signal on 48 which is fed to a over one-hundred indicator 50. The over one-hundred indicator 50 may be a simple flip-flop and is used to produce a signal, fed to the light emitting diodes digital display 44 on line 52, which inhibits or blanks an indication of any numeral other than a "one" in the hundreds column. Since in this embodiment of the invention the measurement period is thirty seconds and it is desired to display this time for use in another clinical function, i.e. pulse taking, an oscillator 54 is required having a frequency of oscillation given by 10 Hz. The oscillator signal is clocked into a conventional decade counter 56 on line 58. The counter 56 has already been cleared by the clear signal on line 30 which was also used to clear the up/down counter 28. The oscillator 54 also provides the general timing signals for the required operations of the subject invention, and so the contents of the decade counter 56 are fed by multi-channel lines 60 to the logic unit 36. In order to obtain the thirty-second display on the light emitting diodes digital display 44, the oscillator 54 clock pulses are fed through the decade counter 56 and into the multiplexer 40 on multi-channel lines.

The logic unit 36 may be of a conventional design and would consist of standard gating and logic circuits arranged so as to provide the timing function, blanking pulses, and enable signals at the appropriate times and for the appropriate durations. The logic unit also controls the multiplex unit 40 by a signal on line 62 so that first the thirty-second timing count is displayed, then the temperature information as contained in the decade counter 28 is displayed. A one-second blanking pulse on line 64 is also provided to supply a brief interval between the display of the two types of information.

Figure 3:
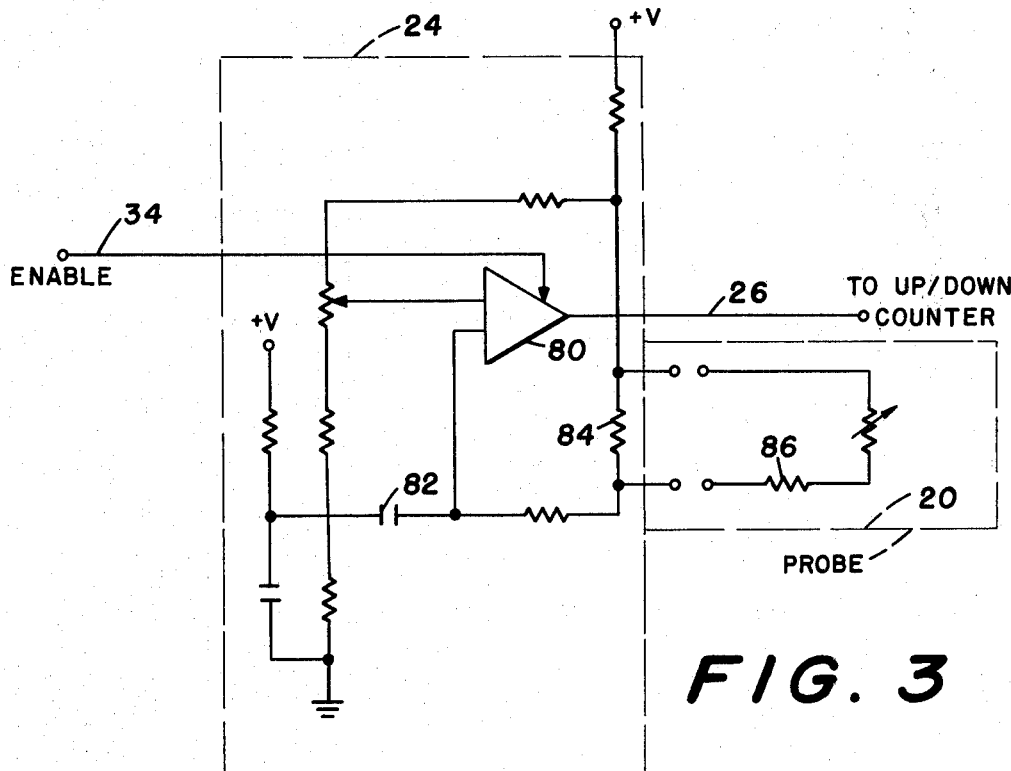
FIG. 3 is a schematic diagram of analog to digital converter as used in the preferred embodiment of the invention as shown in FIG. 2.

In addition, another function of the logic unit 36 is to provide a power off signal on line 66, which is fed to the power switch 68. This signal is produced at the end of a preselected time period during which the display device 44 is displaying the temperature information. A momentary contact start switch 70 is used to trigger the power switch 68, which then produces the counter clear signal on line 30 and serves to start the temperature measuring cycle. p Referring now to FIG. 3, the analog to digital converter 24 of FIG. 2, is shown in more detail. This converter is actually an oscillator whose frequency of oscillation, dependent on R and C, is varied by varying R. In this case, a conventional operational amplifier 80 is connected in the conventional manner to form a free running multivibrator, with exception that the thermistor probe 20 is included in the feedback connection. The variable resistance presented by the thermistor probe 20 when it resonates with the capacitor 82 determines the frequency of oscillation. Additional resistors 84 and 86 are included in the thermistor 20 input circuit in order to balance the input impedance to allow different probes, say rectal and oral, to be used interchangeably. The converter is enabled as was stated by an enable signal on line 34. This turns on the converter for one second for the first temperature measurement $T_1$ and for two seconds for the second temperature measurement $T_2$.

It should be understood that the details of the foregoing embodiment are set forth by way of example only. Any type of thermistor probe may be utilized and the logic may comprise many well known forms. Accordingly, it is contemplated that this invention not be limited by the particular details of the embodiment as shown except as defined in the appended claims.

What is claimed is:

1. An electronic apparatus comprising:
    transducer means for varying an electric parameter in accordance with a condition being measured;
    converter means for converting said electric parameter to a frequency-varying signal;
    computing means connected to said converter means for computing an advance indication of said condition; and
    display means for receiving and displaying said advance indication of said condition;
    said apparatus further comprising control means for controlling said computing means to operate on said frequency-varying signal during first and second time periods to obtain first and second temperature measurements, respectively, said first and second temperature measurements being combined by said computing means to provide said computed advance indication; and
    wherein the sum of said first and second time periods is less than the time said condition actually takes to reach its final value.

2. The apparatus of claim 1, wherein said first and second time periods are of different length.

3. The apparatus of claim 2, wherein said second time period is twice the length of said first time period and occurs after said first time period.

4. The apparatus of claim 1, wherein said computing means comprises an up-down counter which counts up during one of said first and second time periods, and which counts down during the other of said first and second time periods.

5. The apparatus of claim 1, wherein said computing means operates on said frequency varying signal in accordance with $$2T_2 - T_1$$

where $T_1$ is the first temperature measurement, and $T_2$ is the second temperature measurement.

* * * * *